March 14, 1939.                B. LITTMANN ET AL                2,150,448
                                 ANTISKID DEVICE
                              Filed March 2, 1938              2 Sheets-Sheet 1

INVENTOR
BERNHARD LITTMANN
ROBERT C. RUEFF
BY
ATTORNEY

March 14, 1939.  B. LITTMANN ET AL  2,150,448
ANTISKID DEVICE
Filed March 2, 1938  2 Sheets-Sheet 2

INVENTOR
BERNHARD LITTMANN
ROBERT C. RUEFF
BY
ATTORNEY

Patented Mar. 14, 1939

2,150,448

UNITED STATES PATENT OFFICE 2,150,448

ANTISKID DEVICE

Bernhard Littmann, Richmond Heights, and Robert C. Rueff, St. Louis, Mo., assignors to Nixdorff-Krein Manufacturing Co., St. Louis, Mo., a corporation of Missouri Application March 2, 1938, Serial No. 193,460

6 Claims. (Cl. 24—193)

This invention relates generally to anti-skid devices and, more particularly, to a certain new and useful improvement in anti-skid devices of the type commonly known as emergency skid chains.

In recent years, with the increasing mileage of paved roads throughout the country, the automobilist and truck-driver seldom encounter so-called muddy roads and hence anti-skid chains or "mud chains" as they were formerly called, are seldom required for sustained periods of time but at the present time are more commonly required for emergency use to prevent skidding and loss of traction due to ice, sleet, snow, and other hazardous road conditions.

As will be readily appreciated, though, such conditions are largely temporary. After a snow fall or sleet storm, the streets and roads will be unsafe for travel for several hours or so until the storm has passed and the snow and sleet has melted or been worn away by traffic. The requirement for safety of an anti-skid chain is, hence, of short duration,—in fact, as soon as the sleet or snow has left the road surface, it is almost essential to remove the chains, since the chain-links wear quickly and frequently break from even relatively short use on dry concrete or paved roads.

This situation has resulted in the development of a number of so-called "emergency" chains, designed as individual units for strapping around the tire and wheel. Such chains are normally applied to the wheel by the driver after the automobile is on the road and the hazardous condition encountered. Rarely, if ever, does the motorist employ foresight in putting on his chains before leaving the garage. Consequently, the chain should be equipped with a buckle, lock, or other type of securing means which is not only rugged, secure, and tight-gripping, but also relatively simple, convenient, and easy to manipulate.

So far as we are aware, such emergency devices have sacrificed simplicity and ease of manipulation for the sake of security, with the result that the user is caused excessive trouble in chain installation and, in addition, the present types of chain locks, so far also as we are aware, become so tight during use that tremendous effort is required to open the lock for chain removal.

Our invention hence has for its primary objects the provision of an emergency chain having a locking or securing device which may be cheaply constructed, which is simple in operation and manipulation and convenient in installation and removal, which is sturdy, rugged, and durable, which cannot open under unauthorized or accidental stresses, and which is efficient in the performance of its intended functions.

And with the above and other objects in view, our invention resides in the novel features of form, construction, arrangement, and combination of several parts presently described and pointed out in the claims.

In the accompanying drawings (two sheets),—

Figure 6:
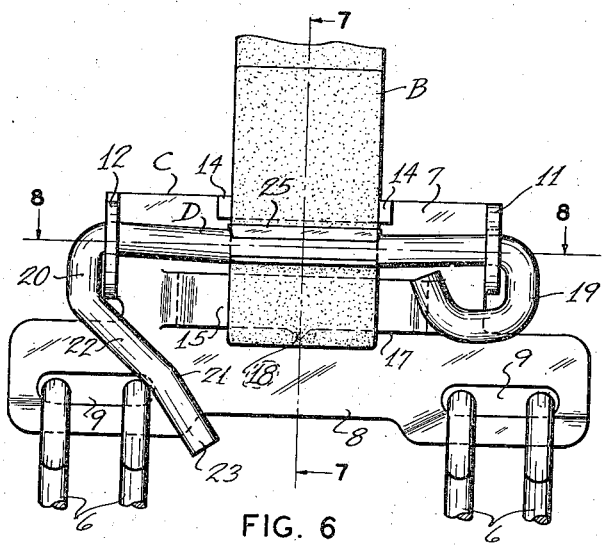
Figure 6 is a substantially full-sized elevational view of the chain-lock in fully closed position.
Figure 8:
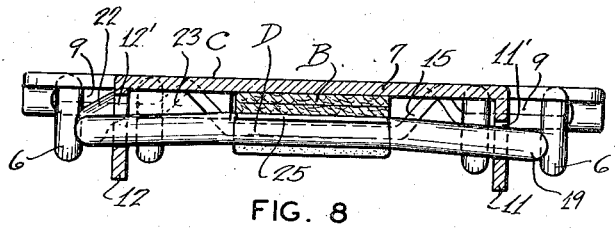
Figure 10:
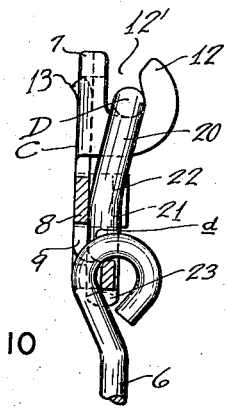
Figure 9:
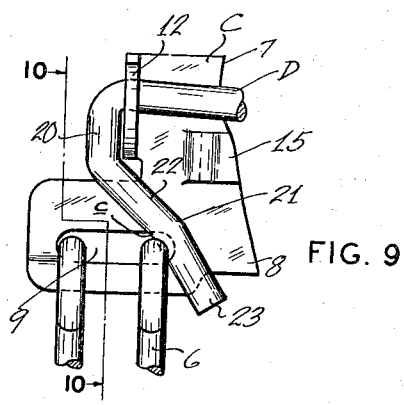

Figure 8 is a cross sectional view of the chain-lock, taken approximately along the line 8—8, Figure 6; and Figures 9 and 10 are enlarged fragmentary detail views of the chain lock structure, the latter being taken along the line 10—10, Figure 9.

Referring now in more detail and by reference characters to the drawings, which illustrate a preferred embodiment of our present invention, the chain proper includes a flat cross-plate A stamped or otherwise formed of suitably strong tough metal and provided centrally of and adjacent its one longitudinal margin with an elongated slot or aperture 1, the plate A being further provided adjacent its opposite longitudinal margin with a pair of elongated slots or apertures 2 each spaced equidistantly on either side of the aperture 1.

Figure 1:
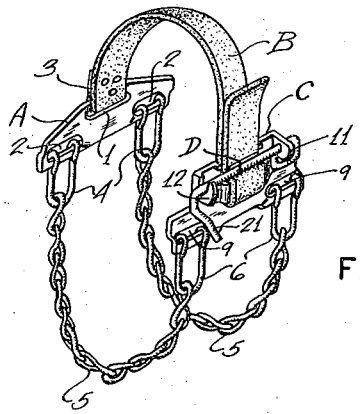
Figure 1 is a reduced perspective view of an emergency skid chain constructed in accordance with and embodying our present invention.

B designates a connector in the form preferably of a heavy flexible strap formed preferably of closely woven cotton cord, which, at its one end, is threaded through the plate aperture 1 and bent back and riveted or otherwise secured upon itself in the provision of a loop 3 for swingable disposition upon the plate A, as best seen in Figure 1.

Swingably mounted on the plate A through the apertures 2, is a pair of U-shaped connector links 4 having at their respective bights hook-connection with the end-links of conventional cross-chains 5, which latter, in turn, are provided at their other end with connector-links 6, all as best seen in Figure 1 and for purposes presently more fully appearing.

Figure 3:
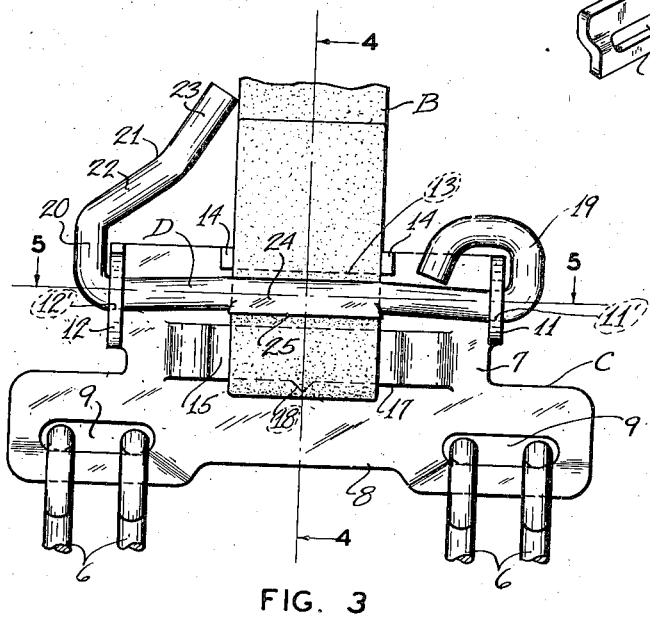
Figure 3 is a substantially full-sized elevational view of the chain-lock in partially closed position.

C designates a flat, approximately T-shaped lock-plate integrally including a shank portion 7 and a transversely extending head-portion 8, which latter, in turn, is formed adjacent its outer longitudinal margin and near its ends with a pair of elongated apertures 9 spaced equidistantly on either side of the shank portion 7. The plate-portion 8 is deformed upwardly from its flat face for off-setting the outer walls of the apertures 9, around which the free ends of the connector links 6 are, respectively, curled and clinched for connecting the cross-chains 5 swingably to the lock plate C, as best seen in Figures 1 and 3.

The shank 7 of the lock-plate C is provided along its opposed parallel margins with upstanding, laterally aligned ears 11, 12, the ear 11 being provided with a circular aperture 11' and the ear 12 being provided with a detent slot 12' parallel with the face of the shank 7. Along its outer transverse margin, the shank 7 is centrally cut away in the provision of a plate-recess 13, at the lateral ends of which the metal of the plate C is struck up in the provision of a pair of opposed guide-ears 14. The outwardly presented longitudinal margin of the plate-recess 13 is preferably bent outwardly from the strap-engaging face of the shank 7 or otherwise rounded off in the provision of a slightly outwardly turned lip 13' for preventing any cutting or abrasion of the strap B when the chain is in actual operation.

Figure 4:
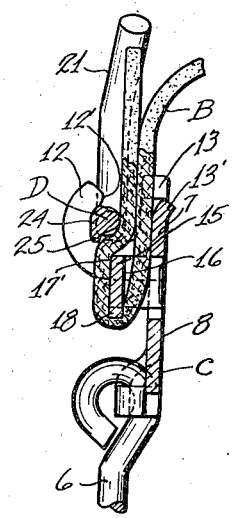
Figure 4 is a longitudinal sectional view of the chain-lock, taken approximately along the line 4—4, Figure 3.

Struck out of the body of the shank 7 and extending transversely thereof parallel to the cross portion 8, is a flat somewhat U-shaped retention bar 15 having its bight 16 parallel to and spaced outwardly from the face of the shank 7 by a distance slightly greater than the thickness of the strap B. Along its one or inwardly presented longitudinal margin 17, the bar 15 is formed with a tooth or serration 18, the bar 15 having its opposite or outwardly presented margin spaced inwardly from the aperture 11' and detent slot 12' by a distance equal to the thickness of the particular strap B, all for purposes presently more fully appearing and as best seen in Figure 4.

Swingably mounted, at an end, as at 19, on the ear 11 of plate C, is a keeper D formed from a steel rod of substantial strength and rigidity. Adjacent its other end, the keeper D is bent sharply forwardly at 90° for a short distance, as at 20, and is then bent backwardly at an oblique angle in the formation of a hook 21 having a flat topped portion 22 and a tail portion 23 for retentive disposition in and around the detent-slot 12' of the shank ear 12.

Figure 2:
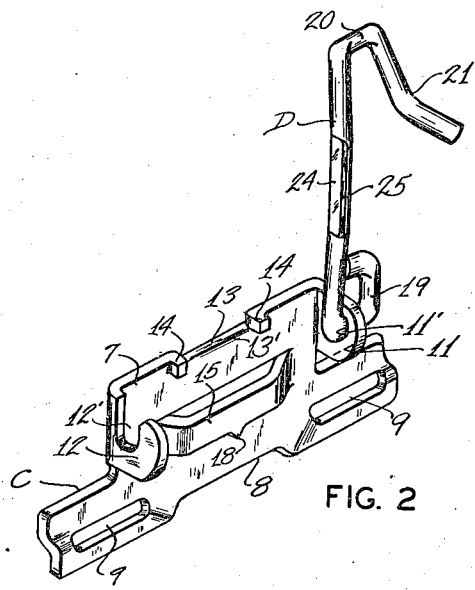
Figure 2 is an enlarged perspective view of the lock or securing member of the chain.
Figure 5:
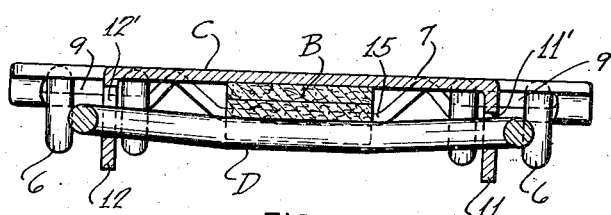
Figure 5 is a cross sectional view of the chain-lock, taken approximately along the line 5—5, Figure 3.

Intermediate its ends, the keeper D is deformed to provide a straight, out-of-round section 24 having a lengthwise extending, radially outwardly projecting lip 25, and intermediate the loop 19 and the bend 20, the keeper D is bowed downwardly and inwardly from its straight axial line, all for purposes presently more fully appearing and as best seen in Figures 2 and 5.

In use, the chains 5 are manually disposed crosswise of the tread of the particular tire and rim, preferably with the cross-plate A disposed flatwise against the inwardly presented side wall of the tire. The strap B is threaded over the wheel felloe between the wheel spokes and the lock-plate C is brought around flatwise on the outwardly presented tire side wall. The strap B is then threaded between the guide ears 14 beneath the bight 16 of the retention bar 15 and is then bent outwardly and backwardly upon itself, as best seen in Figure 4. The keeper D is now turned with its hook portion 21 away from the retention bar 15, as best seen in Figures 2 and 3, and is swung downwardly across the strap B into the detent slot 12', as illustrated in Figure 3. In this position, by reason of the fact that the keeper D is bowed in shape, as stated, the central portion 24 thereof will be relatively farther away from the face of the lock-plate C and hence will exert only moderate pressure on the strap B, although even such moderate pressure will draw the strap into engagement with the protuberant tooth or serration 18 and squeeze the strap B between the keeper D and the forward margin 17' of the retention bar 15, thereby effectually locking the strap B.

Figure 7:
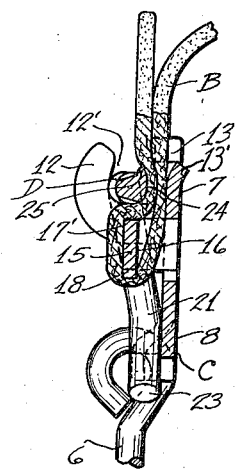
Figure 7 is a longitudinal sectional view of the chain-lock, taken approximately along the line 7—7, Figure 6.

The tail portion 23 of the hook 21 is then swung around, pivoting the entire keeper D to the closed or strap-securing position shown in Figure 6. The straight intermediate portion 22 then lies along the outer face of the shank-ear 12 and the tail-portion 23 lies in back of the shank-ear 12, as best seen in Figure 10, thereby preventing the keeper D from unauthorized movement out of the detent slot 12'. At the same time, the out-of-round portion 24 of the keeper D and its associated lip 25 are rotated somewhat eccentrically against, and thereby tightly squeeze together, the underlying portions of the strap B, as best seen in Figure 7. It has been found that such cam-like or eccentric action of the lip 25, in actual practice, functions also to draw the strap B into tight looped engagement around the retention-bar 15.

In addition, the tail-portion 23 of the hook 21 is preferably bent slightly, at c, so as to fit into the notch-like depression d between the curled end of the connector link 6 and the upper edge of the slot 9, as best seen in Figures 9 and 10. Any object or obstruction striking the hook tail-portion 23 during traffic will consequently force the same more tightly into the depression d, thereby automatically, as it may be said, overcoming any tendency to throw the keeper D around and accidentally unlock the strap B.

It should be understood that changes and modifications in the form, construction, arrangement, and combination of the several parts of the anti-skid chain may be made and substituted for those herein shown and described without departing from the nature and principle of our invention.

Having thus described our invention, what we claim and desire to secure by Letters Patent is,—

1. For use with a flexible connector-strap, a locking structure comprising a plate, a bar operatively connected to, and spaced upwardly from, the plate for permitting the strap to be threaded thereunder and doubled upon itself, a keeper swingably connected at one end on the plate, detent means on the plate having releasably retentive engagement with the other end of the keeper, said keeper when in engaged position being disposable in substantially proximate parallelism to the bar.

2. For use with a flexible connector strap, a locking structure comprising a plate, a bar operatively connected at its ends to, and intermediately spaced upwardly from, the plate for permitting the strap to be threaded thereunder and doubled over the bar flatwise upon itself, an upstanding ear formed on the plate laterally and forwardly of the bar, a catch on the plate in operative alignment with the ear, and a keeper swingably mounted on the ear and releasably engaged in the catch, said keeper when in engaged position being disposed in substantially proximate parallelism to a longitudinal margin of said bar for securing compressive engagement with the doubled-over strap.

3. For use with a flexible connector strap, a locking structure comprising a plate, a bar fixed at its ends on, and intermediately spaced upwardly from, the plate for permitting the strap to be threaded under the bar and doubled over the bar flatwise upon itself, an upstanding ear formed on the plate laterally and forwardly of the bar, a catch formed on the plate in operative alignment with the ear, and a keeper swingably and rotatively mounted on the ear and releasably engaged in the catch, the keeper having an eccentric section intermediate its ends for securing compressive engagement with the doubled-over strap upon rotative movement of the keeper when disposed in catch-engaged position.

4. For use with a flexible connector strap, a locking structure comprising a plate, a bar fixed at its ends on, and intermediately spaced upwardly from, the plate for permitting the strap to be threaded under the bar and doubled over the bar flatwise upon itself, an upstanding ear formed on the plate laterally and forwardly of the bar, a catch formed on the plate in operative alignment with the ear, and a keeper swingably and rotatively mounted on the ear and releasably engaged in the catch, the keeper, when in engaged position, being disposable in substantial parallelism with the bar, and having an eccentric section intermediate its ends for securing compressive engagement with the doubled-over strap upon rotative movement of the keeper.

5. For use with a flexible connector strap, a locking structure comprising a plate, a bar fixed at its ends on, and intermediately spaced upwardly from, the plate for permitting the strap to be threaded under the bar and doubled over the bar flatwise upon itself, an upstanding ear formed on the plate laterally and forwardly of the bar, a catch formed on the plate in operative alignment with the ear, and a keeper swingably and rotatively mounted on the ear and releasably engaged in the catch, the keeper having an eccentric section intermediate its ends for securing compressive engagement with the doubled-over strap upon rotative movement of the keeper when disposed in catch-engaged position, the keeper further having an outwardly projecting lip intermediate its ends for securing compressive engagement with the doubled-over strap.

6. In an anti-skid chain having a flexible connector strap, a locking structure comprising a plate, a bar mounted at its ends on, and intermediately spaced upwardly from, the plate for permitting the strap to be threaded under the bar and doubled over the bar flatwise upon itself, an upstanding ear formed on the plate, a locking member swingably and rotatably mounted on the ear, and when in engaged position, being disposable in substantially proximate parallelism with the bar upon the doubled over end of the strap in front of and parallel to the bar, a retention ear on the plate in opposed juxtaposition to the first-named ear, and means on the locking member for hooked engagement with the retention ear upon rotation of the keeper into locked position.

BERNHARD LITTMANN.
ROBERT C. RUEFF.